United States Patent
Michaeli et al.

(10) Patent No.: US 11,800,014 B2
(45) Date of Patent: *Oct. 24, 2023

(54) METHOD AND SYSTEM FOR PROACTIVE FRAUDSTER EXPOSURE IN A CUSTOMER SERVICE CHANNEL

(71) Applicant: NICE LTD, Ra'anana (IL)

(72) Inventors: Levan Michaeli, Holon (IL); Zvika Weingarten, Kfar Saba (IL); Itay Harel, Kfar Saba (IL); Roman Frenkel, Ashdod (IL); Matan Keret, Oulu (FI); Amit Sharon, Hod HaSharon (IL); Sigal Lev, Hod Hasharon (IL)

(73) Assignee: NICE LTD, Ra'anana (IL)

( * ) Notice: Subject to any disclaimer, the term of this patent is extended or adjusted under 35 U.S.C. 154(b) by 360 days.

This patent is subject to a terminal disclaimer.

(21) Appl. No.: 17/308,065

(22) Filed: May 5, 2021

(65) Prior Publication Data

US 2021/0258423 A1 Aug. 19, 2021

Related U.S. Application Data

(63) Continuation of application No. 16/525,606, filed on Jul. 30, 2019, now Pat. No. 11,039,012.

(51) Int. Cl.
*G10L 17/00* (2013.01)
*H04M 3/51* (2006.01)
(Continued)

(52) U.S. Cl.
CPC .......... *H04M 3/5175* (2013.01); *G06F 21/43* (2013.01); *G06N 20/00* (2019.01); *G10L 15/22* (2013.01);
(Continued)

(58) Field of Classification Search
CPC ............. H04M 3/5175; H04M 3/5166; H04M 3/5191; H04M 2203/6027;
(Continued)

(56) References Cited

U.S. PATENT DOCUMENTS 10,003,688 B1 * 6/2018 Walters ................... G10L 25/51
10,721,350 B1 * 7/2020 Maiorana ................. G06N 3/08
(Continued)

*Primary Examiner* — Pierre Louis Desir
*Assistant Examiner* — Fouzia Hye Solaiman
(74) *Attorney, Agent, or Firm* — SOROKER-AGMON-NORDMAN-RIBA; Sharone Godesh; Liat Lin

(57) ABSTRACT

A computer-implemented method for analyzing call interactions in an interactions database by a Proactive Fraud Exposure (PFE) engine is provided herein. The computer-implemented method may generate a voiceprint for each call interaction; (ii) use a machine learning technique to group the call interactions into one or more clusters based on respective voiceprints in the voiceprints database; (iii) store the one or more clusters; and (iv) rank and classifying the one or more clusters to yield a list of potential fraudsters. The computer-implemented method may further transmit the list of potential fraudsters to a user to enable the user to review said list of potential fraudsters and to add fraudsters from the list to a watchlist database.

13 Claims, 10 Drawing Sheets

(51) Int. Cl.
*G06N 20/00* (2019.01)
*G10L 15/22* (2006.01)
*G10L 17/04* (2013.01)
*G10L 15/26* (2006.01)
*G06F 21/43* (2013.01)

(52) U.S. Cl.
CPC .............. *G10L 15/26* (2013.01); *G10L 17/00* (2013.01); *G10L 17/04* (2013.01); *H04M 3/5166* (2013.01); *H04M 3/5191* (2013.01); *H04M 2203/6027* (2013.01); *H04M 2203/6045* (2013.01); *H04M 2203/6054* (2013.01)

(58) Field of Classification Search
CPC . H04M 2203/6045; H04M 2203/6054; H04M 3/42221; H04M 2201/38; G06F 21/43; G06F 21/32; G06F 21/554; G06N 20/00; G10L 15/22; G10L 15/26; G10L 17/00; G10L 17/04; G10L 17/08; G10L 17/02
USPC ......................................................... 704/270
See application file for complete search history.

(56) References Cited

U.S. PATENT DOCUMENTS

| | | | |
|---|---|---|---|
| 2005/0097051 A1* | 5/2005 | Madill, Jr. ............. | G06Q 20/04 705/50 |
| 2012/0158751 A1* | 6/2012 | Tseng ................. | H04L 61/4594 707/751 |
| 2015/0055763 A1* | 2/2015 | Guerra ................ | H04M 3/4936 379/88.02 |
| 2016/0365095 A1* | 12/2016 | Lousky ................. | G10L 17/04 |
| 2018/0082691 A1* | 3/2018 | Khoury ................. | G10L 17/04 |
| 2019/0037081 A1* | 1/2019 | Rao .................... | H04M 7/0078 |

* cited by examiner

Score matrix with speakers marked after cluster detection

|  | Danny_3 | Sara_2 | Sara_3 | Danny_3 | Sara_2 | Sara_1 | Sara_3 | Danny_2 | John_2 |
|---|---|---|---|---|---|---|---|---|---|
| Danny_1 | | 20 | 5 | 34 | 8 | 2 | 6 | 46 | 7 |
| Sara_2 | 20 | | 6 | 35 | 15 | 47 | 40 | 7 | 10 |
| John_1 | 5 | 6 | | 45 | 1 | 10 | 8 | 7 | 47 |
| Danny_3 | 34 | 35 | 45 | | 12 | 11 | 16 | 32 | 11 |
| Mike | 8 | 15 | 1 | 12 | | 12 | 4 | 28 | 2 |
| Sara_1 | 2 | 47 | 10 | 11 | 12 | | 29 | 7 | 8 |
| Sara_3 | 6 | 40 | 8 | 16 | 4 | 29 | | 0 | 1 |
| Danny_2 | 46 | 7 | 7 | 32 | 28 | 7 | 0 | | 4 |
| John_2 | 7 | 10 | 47 | 11 | 2 | 8 | 1 | 4 | |

METHOD AND SYSTEM FOR PROACTIVE FRAUDSTER EXPOSURE IN A CUSTOMER SERVICE CHANNEL

RELATED APPLICATIONS

This application claims priority as a continuation from application Ser. No. 16/525,606 dated Jul. 30, 2019, the disclosure of which is incorporated herein by reference.

TECHNICAL FIELD

The present disclosure relates to the field of voice biometric security and real-time authentication, and more specifically to method and system for proactive fraudster exposure in a customer service channel by fraudsters clustering and displaying to a user a ranked list of potential fraudsters to add to a watchlist database.

BACKGROUND

Call centers are increasingly becoming a target for fraudsters via their customer service channels. Call center frauds are one of the leading threats that organizations such as financial institutions face. Fraudsters commonly attempt to retrieve information or change information of other legitimate customers by exploiting call center agents by social engineering. For example, fraudsters may conduct an attack on a financial institution by manipulating the call center agents to provide them with confidential information of legitimate customers and then use the extracted information to commit another fraud e.g., identity theft. Instead of social engineering, fraudsters may use information from social networks or public information to correctly answer knowledge-based questions during a call with an agent.

Fraudulent activity may take many shapes and forms. It may be performed via multiple frequent attacks or attempts on a singular legitimate customer account or on multiple customer accounts. The attacks may be via different channels such as mobile application, call-center calls or internet on different lines of business e.g., VIP handling agents. Another type of attack is a "targeted attack" in which the attack is targeted to a specific individual i.e., customer. Yet, another type of attack is "spread out attack" in which the attack is on various customers in the call center.

Currently, one practice to mitigate the threats to the call center is having a fraud team including a few security officers. These few security officers are responsible to make sure that the customers data is protected by investigating fraudulent behavior with their existing tools or following customers complaints and handling those scenarios. However, listening to a large amount of call interactions of thousands of agents which respond to abundance calls per day, might be inefficient. Also, these security officers struggle to detect most of the fraudulent activities and fraudsters and add the detected fraudsters to their known fraudsters list but, this practice does not provide coverage for unknown fraudsters which are not in the known fraudsters list.

Furthermore, the implementation of current practices maintains the call centers exposed to fraudsters. The sample of random calls, out of the plethora of calls, that is checked by the few security officers may overlook some of the fraudsters. Therefore, there is a need for a proactive fraudster exposure system and method that will analyze the big data of call interactions and extract information related to fraudsters, to be later on presented to security officers, so they will add the fraudsters to a watchlist, so that in the future they could be blocked, in real-time.

Currently, there is no solution that provides the ability to automatically detect new fraudsters by analysis of varied and high-volume call interactions which are occurring in high velocity together with biometric authentication technique such as voice signature, in real-time. Furthermore, currently there is no solution that does not require any manual pre-setup or pre-sorting of audio calls.

SUMMARY

There is thus provided, in accordance with some embodiments of the present disclosure, a method for proactive fraudster exposure in a customer service center having multiple service channels.

In accordance with some embodiments of the present disclosure, the computer-implemented method comprising: (a) collecting call interactions from a database of recorded calls in a customer service channel. The collecting is based on predefined rules by a calls collection engine; (b) storing the collected call interactions in an interactions database; (c) analyzing the call interactions in the interactions database by a Proactive Fraud Exposure (PFE) engine, said analyzing comprising: (i) generating a voiceprint for each call interaction in the interactions database to be stored in a voiceprints database; (ii) using machine learning technique to group the call interactions in the interaction database into one or more clusters based on respective voiceprints in the voiceprints database. Each one of the one or more clusters is associated with a repeating speaker's voice based on the generated voiceprints; (iii) storing the one or more clusters in a clusters database; and (iv) ranking and classifying the one or more clusters stored in the clusters database to yield a list of potential fraudsters, and (d) transmitting the list of potential fraudsters to an application to display to a user the list of potential fraudsters via a display unit, thus enabling said user to review said list of potential fraudsters and to add fraudsters from the list to a watchlist database.

Furthermore, in accordance with some embodiments of the present disclosure, the generating of voiceprints is performed by extracting i-vectors which represents a speaker effect and a channel effect.

Furthermore, in accordance with some embodiments of the present disclosure, the method further comprising detecting fraudsters which are stored on the watchlist database in new call interactions to the customer service center via one of the multiple service channels, in real-time.

There is further provided, in accordance with some embodiments of the present disclosure, the ranking is performed by at least one of: (i) inter-cluster statistics; and (ii) probability of representing a fraudster or any combination thereof.

Furthermore, in accordance with some embodiments of the present disclosure, the probability of representing a fraudster is calculated based on at least one of the following factors: (i) same voice on same claimed customer; (ii) same voice on different claimed customers; (iii) fraudulent behavioral characteristics of the call interaction, manifested in the voice; (iv) metadata representing details of a predefined line of business.

Furthermore, in accordance with some embodiments of the present disclosure, the method further comprising attributing a predefined weight value to the factors and the wherein the ranking is further based on a weighted average of the factors.

Furthermore, in accordance with some embodiments of the present disclosure, the predefined rules are at least one of: (i) mismatch during customer authentication; (ii) business data; (iii) agents that are associated with a risk group or line of business; (iv) behavioral flows of the speaker; (v) call content analysis; and (vi) frequency of the call interactions or any combination thereof.

Furthermore, in accordance with some embodiments of the present disclosure, the analyzing is performed on audio or textual content.

Furthermore, in accordance with some embodiments of the present disclosure, the collecting is further based on automated machine-learning algorithms, such as phonetic speech and voice analysis.

Furthermore, in accordance with some embodiments of the present disclosure, the ranking further includes: (i) comparing each call interaction in the interaction database to all other call interactions in the call interaction database to yield a matrix of comparisons; (ii) scoring each pair of call interactions based on the extracted i-vectors; (iii) retrieving from each row in the matrix of comparisons a pair of call interactions (i,j) with the higher score; and (iv) for each retrieved pair of call interactions (i,j) perform clustering.

Furthermore, in accordance with some embodiments of the present disclosure, the clustering is performed according to the following conditions: when the score of the pair of call interactions (i,j) is higher than a predefined threshold: a. when both call interactions (i,j) were not assigned to a cluster, assign both interactions to a new cluster; b. when only one of the call interactions (i,j) is assigned to a cluster add the call interaction that is not assigned to the cluster; c. when both call interactions are assigned merge them to one cluster; when the score of the pair of call interactions (i,j) is not higher than a predefined threshold: call interaction (i) is assigned to a new cluster. Call interaction (i) has the highest score in a row.

Furthermore, in accordance with some embodiments of the present disclosure, the classifying comprises calculating a confidence value for each cluster based on the inner ties between the call interactions in the cluster.

There is further provided, in accordance with some embodiments of the present disclosure, a computerized system for proactive fraudster exposure in a customer service center having multiple service channels. The processor may be configured to: (i) collect call interactions for analysis from a database of recorded calls in a customer service channel. The collecting may be based on predefined rules by a calls collection engine. (ii) store the collected call interactions in an interaction database; (iii) analyze the call interactions in the interaction database by a Proactive Fraud Exposure (PFE) engine, said analyze comprising: a. generating a voiceprint for each interaction in the interaction database to be stored in a voiceprints database; b. using machine learning technique to group the call interactions in the interaction database into one or more clusters, based on respective voiceprints in the voiceprints database. Each one of the one or more clusters is associated with a repeating speaker's voice based on the generated voiceprints; c. storing the one or more clusters in a clusters database; and ranking and classifying the one or more clusters stored in the clusters database to yield a list of potential fraudsters; and (iv) transmit the list of potential fraudsters to an application to display to a user said list of potential fraudsters via a display unit thus, enabling said user upon review of said list of potential fraudsters to add fraudsters from said list of potential to a watchlist database and when the fraudster calls the customer service center, it may be detected in real-time.

BRIEF DESCRIPTION OF THE DRAWINGS

In order for the present disclosure, to be better understood and for its practical applications to be appreciated, the following Figures are provided and referenced hereafter. It should be noted that the Figures are given as examples only and in no way limit the scope of the disclosure. Like components are denoted by like reference numerals.

FIGS. 5A-5B schematically illustrate score matrix with speakers marked after cluster detection and the grouping of the interactions into one or more clusters, respectively, in accordance with some embodiments of the present disclosure;

DETAILED DESCRIPTION

Figure 1:
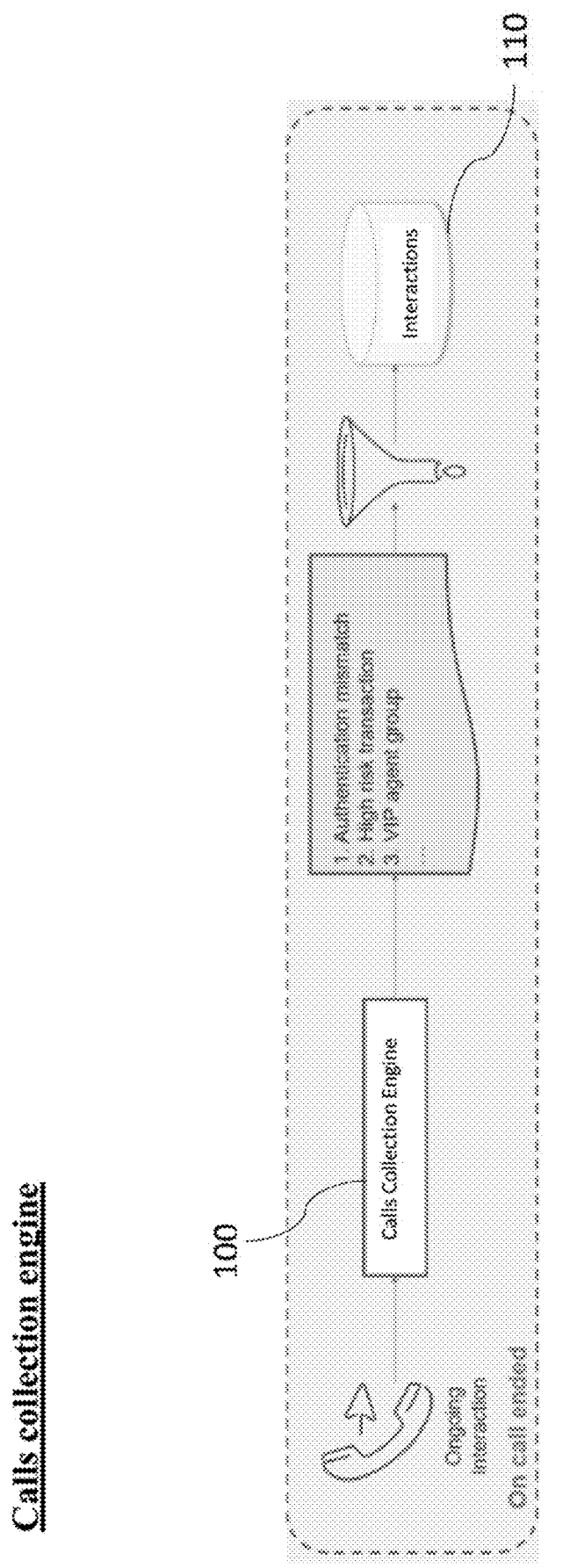
FIG. 1 schematically illustrates a calls collection engine, in accordance with some embodiments of the present disclosure.

In the following detailed description, numerous specific details are set forth in order to provide a thorough understanding of the disclosure. However, it will be understood by those of ordinary skill in the art that the disclosure may be practiced without these specific details. In other instances, well-known methods, procedures, components, modules, units and/or circuits have not been described in detail so as not to obscure the disclosure.

Although embodiments of the disclosure are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium (e.g., a memory) that may store instructions to perform operations and/or processes. Although embodiments of the disclosure are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. Unless explicitly stated, the method embodiments described herein are not constrained to a particular order or sequence. Additionally, some of the described method embodiments or elements thereof can occur or be performed simultaneously, at the same point in time, or concurrently. Unless otherwise indicated, use of the conjunction "or" as used herein is to be understood as inclusive (any or all of the stated options).

The term "voiceprint" as used herein refers to a stored sample of a voice of a user which is used to identify and authenticate the user via speaker recognition based on characteristics of voice. The characteristics of the voice may be selected from the group consisting of: volume, pace, pitch, resonance, articulation, enunciation, respiration, pauses, timber, stress, rhyme, diction, dialect and the like.

The term "cluster" as used herein refers to a set of call interactions.

The term "social engineering" as used herein refers to manipulating agents to provide confidential information to a speaker that pretends to be a legitimate customer.

The term "i-vector" as used herein refers to intermediate vectors or identity vectors which is an enhancement for a previously used approach in speaker verification technology called Joint Factor Analysis (JFA). JFA divides a human voice into two factors: a speaker factor and a channel factor. The data structure of the i-vectors may be an array, and each element in the data structure is representing a characteristic of the speech of a speaker. The i-vectors are generated as part of voiceprint generation for later on comparison.

The term "similarity score" as used herein refers to a comparison of two voice samples based on extracted i-vectors.

The term "watchlist" as used herein refers to a list of known fraudsters which is commonly saved in a database.

The term "customer service channels" as used herein refers to one type of channel or more through which a customer service center of an organization suggests service to its customer. E.g., a customer may complete an action with the organization via one of the following customer service channels: Interactive Voice Response (IVR), mobile application or speaking with an agent.

The term "threshold" as used herein refers to a scalar such that:

$$\text{Interactions } a \text{ and } b \text{ are} = \begin{cases} \text{mismatch}, & \text{score}(a, b) \leq \text{threshold} \\ \text{match}, & \text{score}(a, b) > \text{threshold} \end{cases}$$

The term "claimed customer" as used herein refers to the speaker's claimed identity i.e., the details of a legitimate customer, which is provided by a fraudster in a call interaction between a fraudster and an agent.

Nowadays, organizations must verify customers' identity to protect them and their data from fraud, especially with the rise in identity theft and account takeover, which incur high costs. For that purpose, and also to increase the level of security, there are system and methods for authentication and fraud prevention for customer service channels which are based on voice biometrics technology and other factors. Biometrics technology automatically verifies the speaker's claimed identity, commonly, within the first few seconds of a call through natural conversation with an agent in the customer service channel. The biometric technology verifies the identity of the speaker by comparing a sample of an ongoing call interaction of the speaker with a voiceprint.

These systems and methods which are based on biometric technology, scan pre-created watchlists against the speaker's voice and call characteristics at the beginning of each call to identify suspected fraud. When a suspected speaker is identified, the systems and methods can send an alert to the security officers, block the caller from committing a fraud and even block when calls are made in the future, thus lowering overall spending of the organization on authentication.

However, the construction of the watchlists may still require manual checks and may be time consuming, therefore there is a need for a system and method that will eliminate the expense and time needed for manual checks by analyzing the big data of call interactions and extracting information related to fraudsters to be later presented to security officers, and upon review they will add the fraudsters to the watchlist.

The embodiments taught herein solve the technical problem of checking and analyzing varied high-volume call interactions which are occurring in high velocity, to detect and identify fraudsters.

The embodiments taught herein relating to call interactions in a customer call center with call interactions between a customer and an agent i.e., a call center representative is merely shown by way of example and technical clarity, and not by way of limitation of the embodiments of the present disclosure. The embodiments herein for proactive fraudster exposure in a customer service channel may be applied on any customer service channel such as IVR or mobile application. Furthermore, the embodiments herein are not limited to a call center but may be applied to any suitable platform providing customer service channels.

FIG. 1 schematically illustrates a calls collection engine, in accordance with some embodiments of the present disclosure.

According to some embodiment, in the customer service center, all call interactions are recorded and stored in a database of recorded calls. A calls collection engine 100 receives call interactions from a database of recorded calls where some of the calls may be ongoing calls.

According to some embodiments, a user e.g., a security officer may define a set of rules which are applied on all call interactions and determine which call interactions should be further analyzed. The set of rules may include various types of rules. For example, (i) The speaker got mismatch result during authentication procedure; (ii) The speaker asked to perform a high-risk transaction; (iii) The agent that handled the call is associated to a special group that should always be monitored, e.g., VIP customers. The calls collection engine 100 may apply predefined rules on the call interactions to extract call interactions for further analysis i.e., pending interactions to be stored in an interactions database 110, thus lowering the high volume of call interactions that must be checked by the security officers. The predefined rules may be at least one of: (i) mismatch during customer authentication; (ii) business data; (iii) agents that are associated with a risk group or line of business; (iv) behavioral flows of the speaker; (v) call content analysis; (vi) frequency of the call interactions or any combination thereof.

In a non-limiting example, mismatch during customer authentication may occur when in the authentication procedure the data that the user provides does not match the authentication data that is saved in the organizations database. Further, in a non-limiting example business data may include high-risk transactions such as money transfer when the organization is a financial institution. Furthermore, in a non-limiting example, agents that are associated with a risk group or line of business may be agents which provide service to VIP customers. Furthermore, in a non-limiting example, behavioral flows of the speaker.

In a non-limiting example, a call content analysis may be related to search for keywords and phrases. In another non-limiting example, frequency of the call interactions relates to the number of call interactions from the same speaker in a predefined time interval.

According to some embodiments, when a call ends its information is sent to a Calls Collection Engine 100 to see if the interaction matches to one or more of the predefined rules of the system. If the call interaction matches one or more of the rules, it is stored in the interactions database 110 to be later on analyzed by the PFE engine which is shown in detail in FIG. 2.

Figure 2:
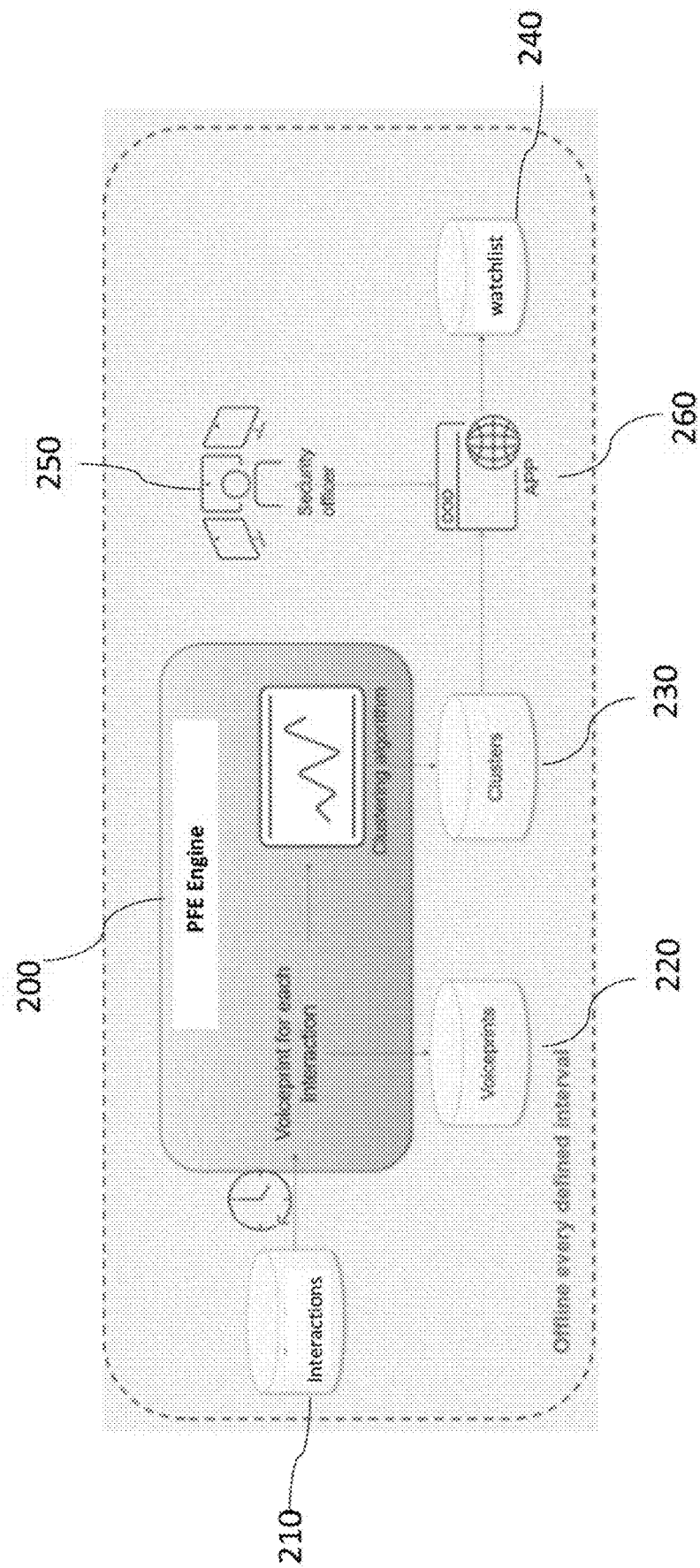
FIG. 2 schematically illustrates a proactive fraud exposure engine, in accordance with some embodiments of the present disclosure.

FIG. 2 schematically illustrates a proactive fraud exposure engine, in accordance with some embodiments of the present disclosure.

Once a call interaction is stored in interactions database 210 (i.e., 110 in FIG. 1) by the Calls Collection Engine 100 in FIG. 1, the PFE engine 200 may retrieve and read the information of the call interaction from the interactions database 210 to analyze it.

Figure 3A:
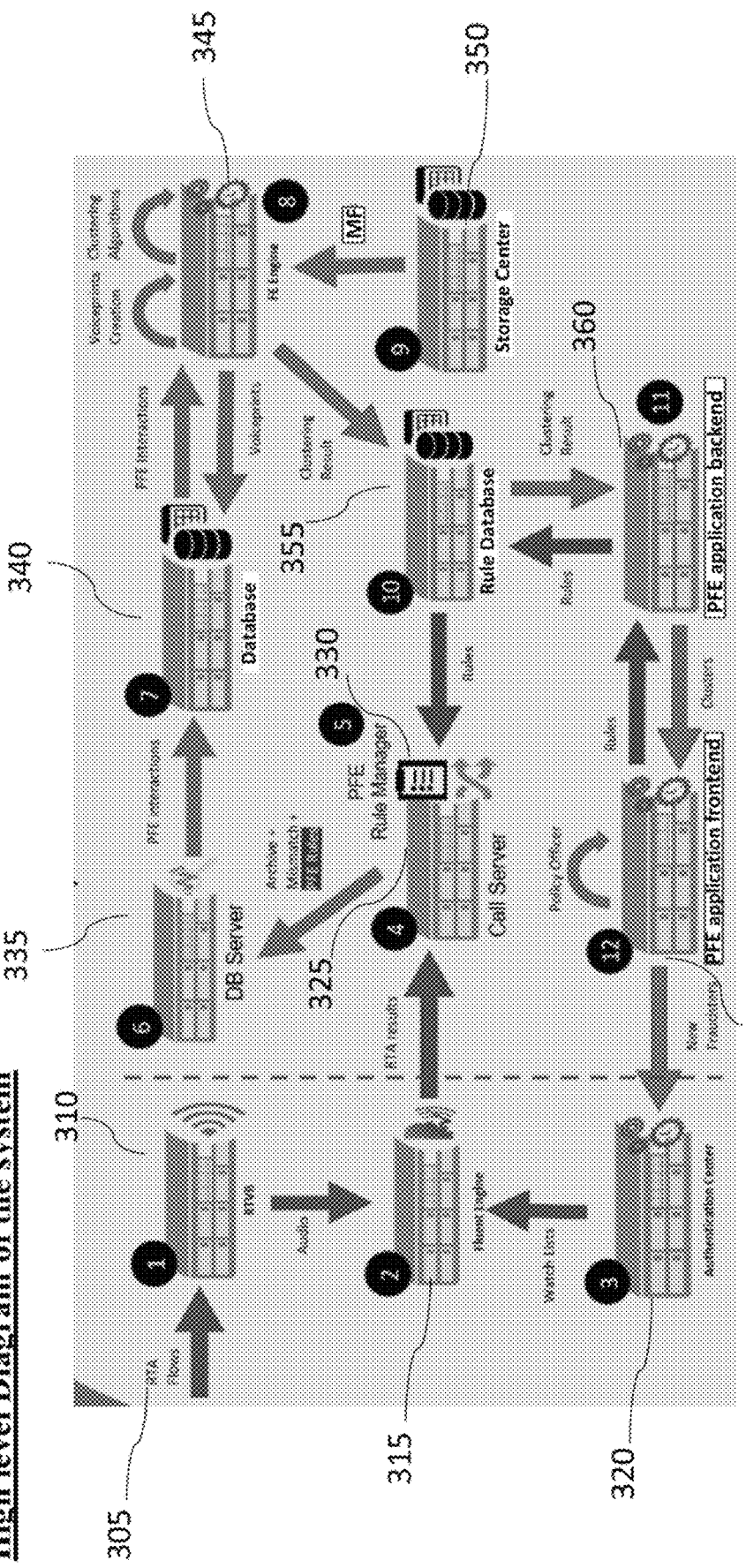
FIG. 3A is a high-level diagram of the system, in accordance with some embodiments of the present disclosure.
Figure 3B:
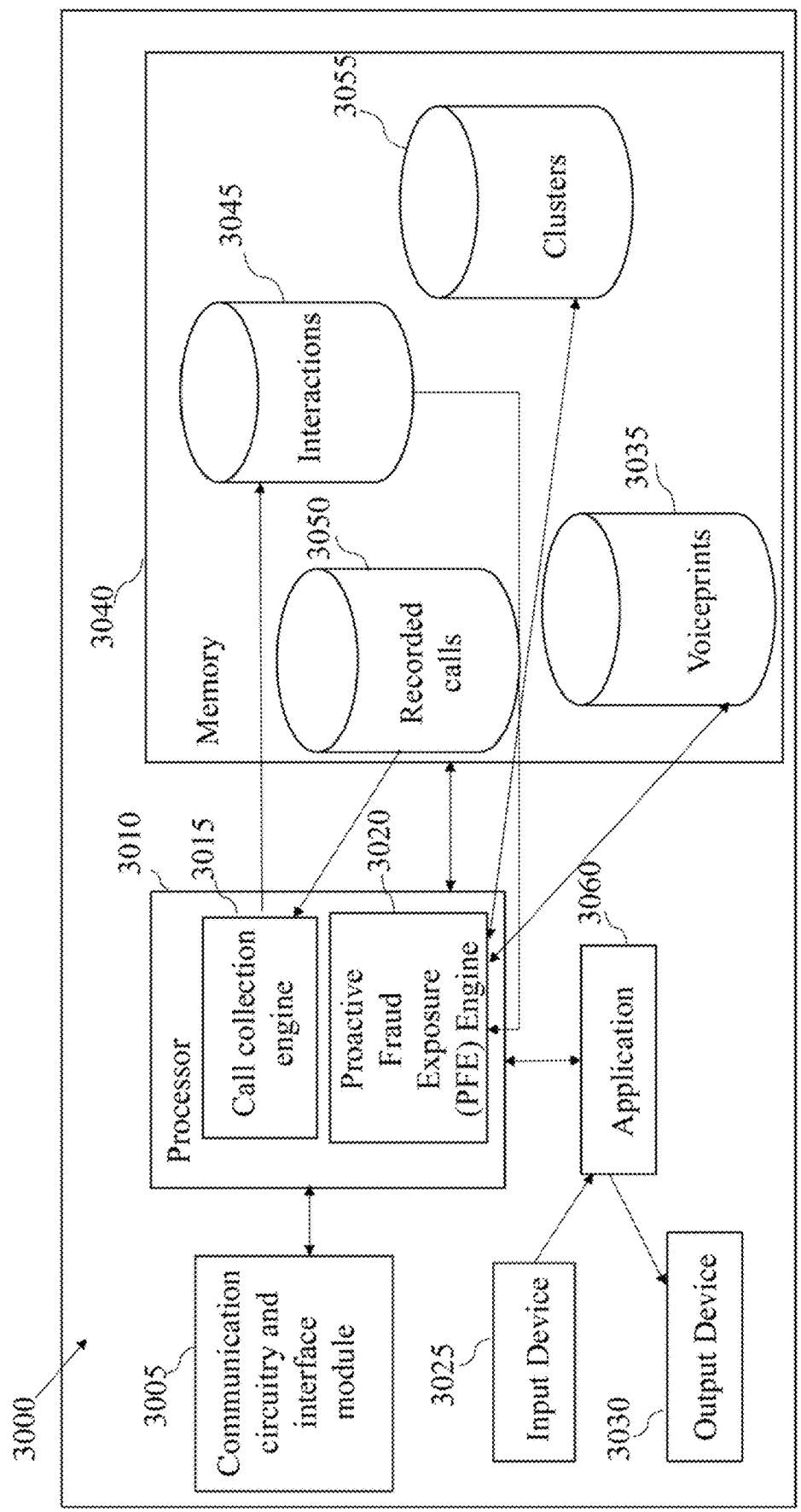
FIG. 3B schematically illustrate a system for proactive fraudster exposure in a customer service center having multiple channels, in accordance with some embodiments of the present disclosure.

According to some embodiments, Calls Collection Engine 100 in FIG. 1 and PFE engine 200 may include a processor, a memory, an output device, an input device and communication circuitry and interface module for wired and/or wireless communication with any other computerized device over a communication network, as illustrated in FIG. 3B, described hereinbelow.

According to some embodiments, in a non-limiting example, the user may be a security officer and the data may be details of fraudsters to be added to a watchlist database 240 and the instructions may be the rules, which are applied on all call interactions and determine which call interactions should be further analyzed.

According to some embodiments, the PFE Engine 200 may use the processor and memory to generate a voiceprint for each call interaction in the interactions database 210 to be stored in a voiceprints database 220.

Next, according to some embodiments, the PFE Engine 200 may be using machine learning technique to group the call interactions in the interaction database 210 based on the voiceprints database 220 into one or more clusters which may be stored in a clusters database 230. Each one of the one or more clusters is associated with a repeating speaker's voice based on the generated voiceprints.

According to some embodiments, the one or more clusters in the clusters database 230 may be ranked and classified to yield a list of potential fraudsters.

According to some embodiments, the list of potential fraudsters may be transmitted to an application 260 over a communication network, to be later on displayed to a user via a display unit 250. The user may be a security officer that may review the list of potential fraudsters and listen to the call that is in the respective cluster. Upon reviewal, when the security officer suspects that the call has been made by an actual fraudster, the security officer may add the call and the respective fraudsters information via the application 260 to a watchlist database 240. The application 260 may be web application or desktop application.

According to some embodiments, after the details of the fraudster are stored in the watchlist database 240, when the fraudster calls the customer service center, it may be detected in real-time. An alert may be sent to the users i.e., the agents and/or the security officers upon the detection for further monitoring and analysis or alternatively the call may be blocked.

FIG. 3A is a high-level diagram of the system, in accordance with some embodiments of the present disclosure.

According to some embodiments, Real Time Authentication (RTA) flows 305 may be sent to Real Time Voice Buffering (RTVB) 310 which may be buffering the call's audio to a Fluent Engine 315. The Fluent Engine 315 is a voice biometric engine that is performing authentication and fraud detection. An authentication center 320 holds the fraudsters watchlists and may forward the watchlists to the Fluent Engine 315. RTA results are transmitted to a call server 325 which manages all the calls and controls the call recording by initiating the call recording in the system and the buffering which is performed by RTVB 310. The call server 325 also saves all the call-related metadata to the DB server 335, i.e., once a call ends call-related metadata such as if the call was indeed recorded and archived, certain business data or having an authentication mismatch is being saved.

According to some embodiments, Proactive Fraud Engine (PFE) Rule Manager 330 which is a sub-component of the call server 325 may tag the relevant PFE calls according to predefined PFE rules. Once a call ends, the tagged PFE calls may be transmitted to a DB Server 335. The DB server 335 manages all the call interactions with all the databases which are the rule database 335 and the voiceprints database such as database 340.

According to some embodiments, PFE call interaction are forwarded to database 340 which holds the pending PFE interactions and the PFE voiceprints. PFE Engine 345 creates the voiceprints from the tagged calls and performs the clustering algorithms.

According to some embodiments, Storage Center 350 may hold the archived calls as Media Files (MF) and may forward MF to PFE Engine 345. PFE Engine 345 may forward clustering result to Rule database 355, which holds the PFE application data.

PFE application Backend 360 serves the PFE application frontend requests. PFE Frontend 365 is the application where a user can define rules, review the clustering results, manage them and add new fraudsters to the watchlist database 240 in FIG. 2.

FIG. 3B schematically illustrates a system for proactive fraudster exposure in a customer service center having multiple channels, in accordance with some embodiments of the present disclosure.

According to some embodiments, Calls Collection Engine 100 in FIG. 1 and PFE engine 200 may include a processor 3010, a memory 3040, an input device 3025, an output device 3030, and a communication circuitry and interface module 3005 for wired and/or wireless communication with any other computerized device over a communication network.

According to some embodiments, the processor 3010 may be configured to operate in accordance with programmed instructions stored in memory 3040 and may include one or more processing units, e.g., of one or more computers. The processor 3010 may be further capable of executing an engine such as PFE engine 3020 (also shown in FIG. 2 as 200), for generating a voiceprint of a speaker out of an audio sample. The voiceprint is stored in a voiceprints database such as voiceprints database 3035.

According to some embodiments, the processor 3010 via PFE 3020 may communicate with an output device such as output device 3030 via application 3060. For example, the output device 3030 may include a computer monitor or screen and the processor 3010 may communicate with a screen of the output device 3030. In another example, the output device 3030 may include a printer, display panel, speaker, or another device capable of producing visible, audible, or tactile output.

According to some embodiments, the processor 3010 via PFE 3020 may further communicate with an input device such as input device 3025 via application 3060. For example, the input device 3025 may include one or more of a keyboard, keypad or pointing device for enabling a user to input data or instructions for operation of the processor 3010. In a non-limiting example, the user may be a security officer and the data may be details of fraudsters to be added to a watchlist database 240 in FIG. 2 and the instructions may be the rules, which are applied on all call interactions and determine which call interactions in the recorded calls database 3050 should be stored in interactions database 3045 to be further analyzed by the PFE engine 3020 (also shown in FIG. 2 as 200).

According to some embodiments, a user may insert the rules according to which call interactions in the recorded calls database 3050 should be stored in interactions database 3045, via application 3060. In some embodiments, a user may receive a list of potential fraudsters and update the watchlist database 240 (FIG. 2) via application 3060 (also shown as application 260 in FIG. 2).

According to some embodiments, a calls collection engine such as call collection engine 3015 (also shown in FIG. 1 as 100) may receive call interactions from a database of recorded calls such as recorded calls database 3050, where some of the calls may be ongoing calls.

According to some embodiments, the processor 3010 may further communicate with memory 3040. The memory 3040 may include one or more volatile or nonvolatile memory devices. The memory 3040 may be utilized to store, for example, programmed instructions for operation of the processor 3010, data or parameters for use by the processor 3010 during operation, or results of the operation of the processor 3010. For example, the memory 3040 may store: recorded calls database 3050, call interactions in interactions database 3045 (also shown in FIG. 2 as 210), voiceprints in voiceprints database 3035 (also shown in FIG. 2 as 220) and clusters in a clusters database 3055 (also shown in FIG. 2 as 230).

According to some embodiments, the processor 3010 may use PFE engine 3020 (also shown in FIG. 2 as 200) to implement machine learning technique to group the call interactions in the interaction database 3045 into one or more clusters and store the clusters in the clusters database 3055. Each one of the one or more clusters is associated with a repeating speaker's voice based on the generated voiceprints stored in the voiceprints database 3035.

According to some embodiments, the processor 3010 may further use the PFE engine 3020 to rank and classify the one or more clusters stored in the clusters database 3055 to yield a list of potential fraudsters.

Figure 4:
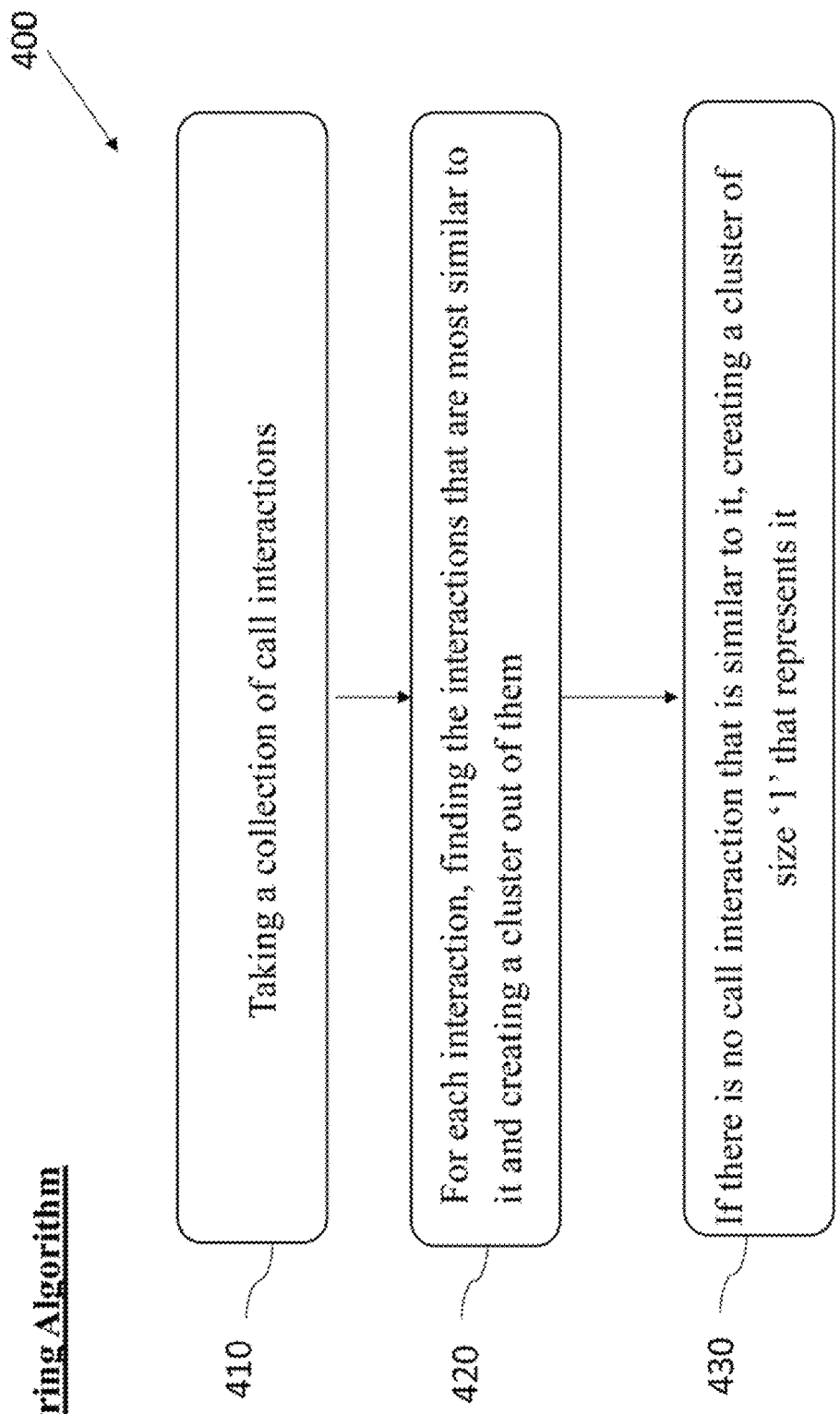
FIG. 4 is a high-level flow diagram depicting clustering algorithm, in accordance with some embodiments of the present disclosure.

FIG. 4 is a high-level flow diagram depicting clustering algorithm, in accordance with some embodiments of the present disclosure. The steps described herein below may be performed by a processor.

According to some embodiments, operation 410 may comprise taking a collection of call interactions. Operation 420 may comprise, for each call interaction, finding the call interactions that are most similar to it and creating a cluster out of them.

In some embodiments, clustering algorithm 400 may further comprise operation 430, which may comprise, if there is no call interaction that is similar to it, creating a cluster of size '1' that represents it. Next, clustering algorithm 400 may comprise ranking the clusters and determining which clusters have the highest confidence level.

In some embodiments, clustering algorithm 400 may be illustrated by the following pseudo code:
Given N interactions, and a threshold (T)–init N empty groups (G).
Create a N×N matrix (M) containing compare scores of all pairwise comparisons.
Diagonal values should be (–infinity).
For i from 0 to N:
  Find the maximum value for row i, let's say it's in index j
  if maximum>T:
    if G[i] and G[j] are both empty—assign them to a new cluster.
    if G[i] is empty and G[j] is not—assign G[i] to G[j] (and vice versa).
    if G[i] and G[j] are both assigned—merge them.
  If not:
    G[i] is assigned to a new cluster
T is determined in the following way:
  Take all the pairwise scores, calculate their mean and variance,
  T=mean–Z*variance.
  Where Z is empirically tested to be from 1 to 2 (commonly 2)
  Optionally, when detecting extremely large clusters, for example more than 100 calls in one cluster, repeat all the above for each large cluster, creating sub-clusters.

Figure 5B:
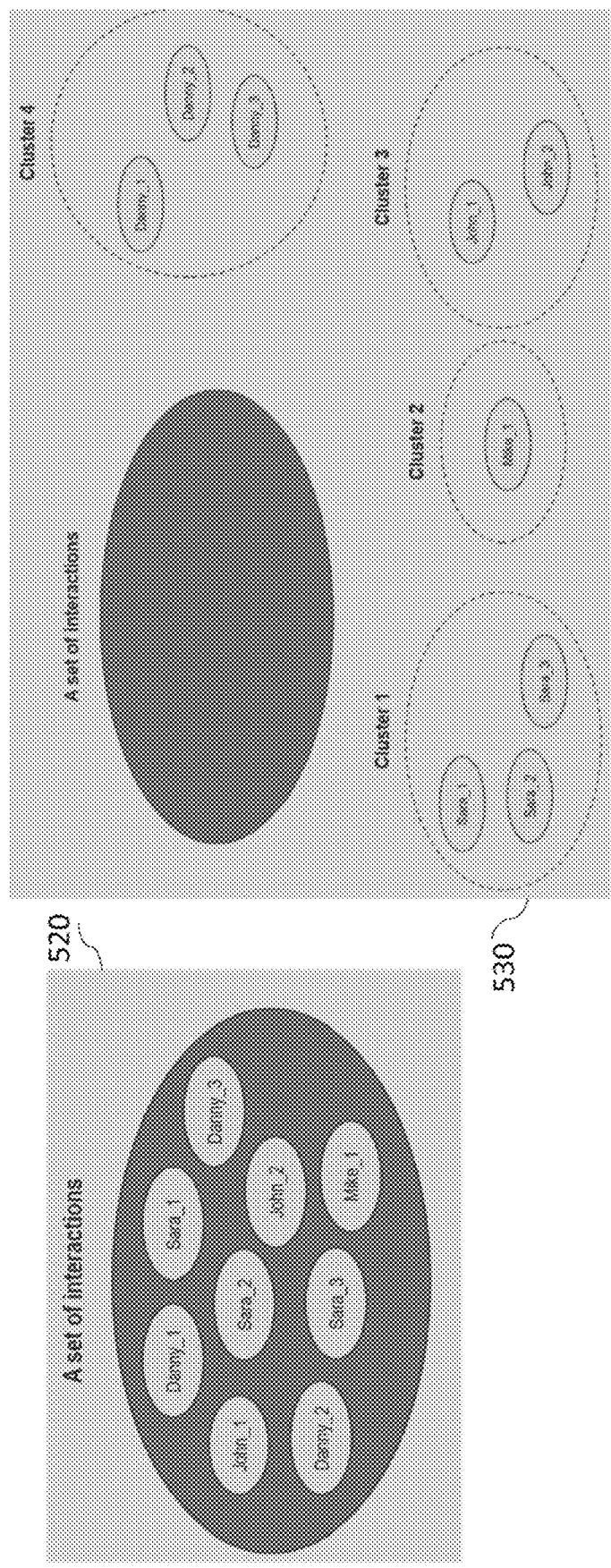

FIGS. 5A-5B schematically illustrate score matrix with speakers marked after cluster detection and the grouping of the interactions into one or more clusters, respectively, in accordance with some embodiments of the present disclosure.

According to some embodiments, in a non-limiting example a score matrix with speakers marked after cluster detection 510 is shown. In the matrix, given a set of call interactions, there is a pairwise comparison of all to all, and similarity scores. The similarity scores are calculated based on i-vectors of each speaker according to a similarity algorithm.

According to some embodiments, given a threshold, in a non-limiting example, the threshold value may be '25', all call interactions are clustered together in a set of interactions as shown in 520 (in FIG. 5B). If the similarity score of call '1' and call '2' is the highest in a row, then when it is higher than a predefined threshold then that call interaction is clustered in set of interactions 520.

According to some embodiments, the set of interaction 520 is later on divided into clusters according to the clustering algorithm 400 described in FIG. 4. The result of the clustering algorithm is shown in 530.

Figure 6:
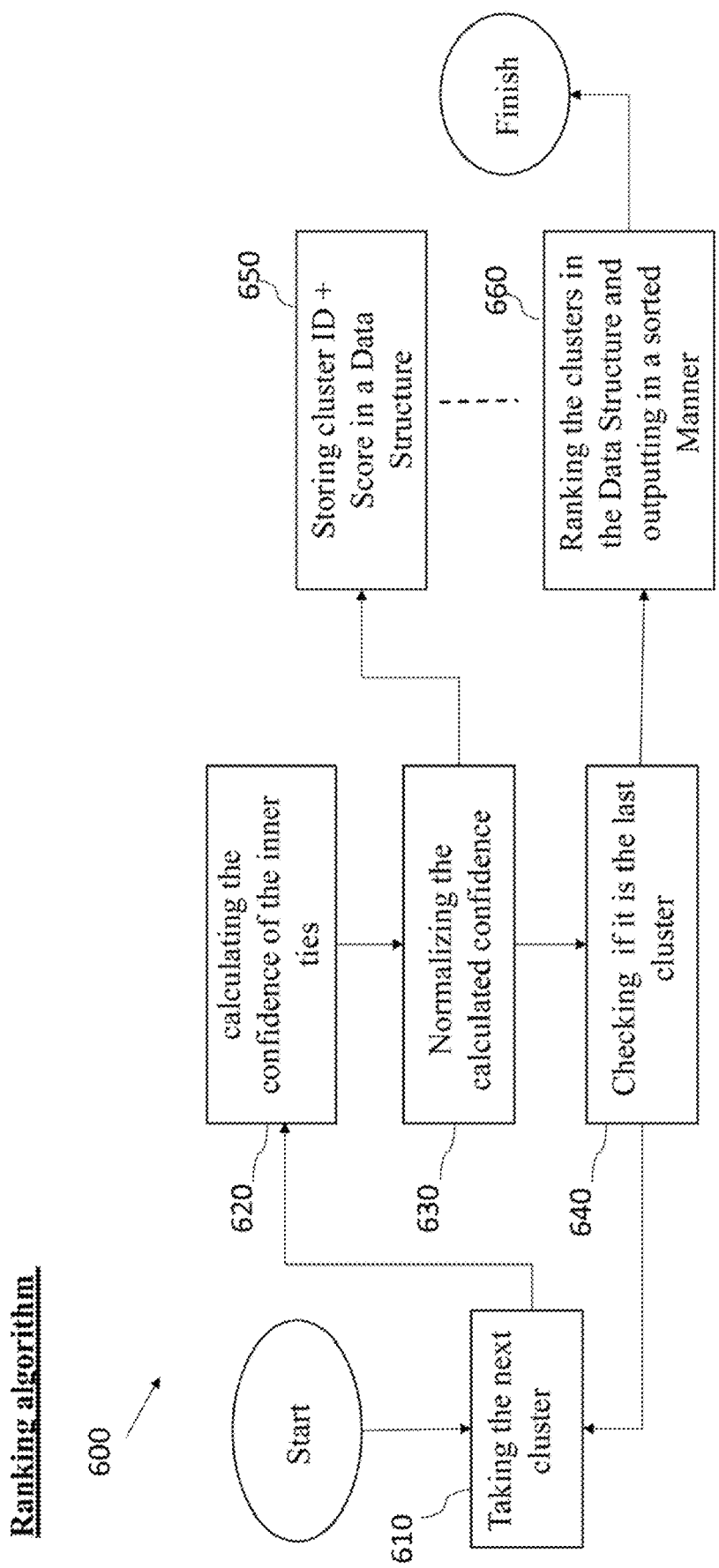
FIG. 6 is a high-level flow diagram depicting a ranking algorithm, in accordance with some embodiments of the present disclosure.

FIG. 6 is a high-level flow diagram depicting a ranking algorithm 600, in accordance with some embodiments of the present disclosure.

According to some embodiments, in operation 610 the ranking algorithm 600 may take all the clusters shown in element 530 in FIG. 5B.

According to some embodiments, operation 620 may comprise, for each cluster, calculating the confidence of the inner ties, and then in operation 630 normalizing the calculated confidence to yield a score.

According to some embodiments, the normalization is needed because the matrix includes the speaker effect and the channel effect, and this is also manifested in the i-vectors themselves, therefore there is a need to later normalize the channel effect.

In some embodiments, operation 640 may comprise checking if it is the last cluster and operation 650 may comprise storing the cluster ID and the score in a data structure. In operation 660 this score is used to ranking the clusters in the data structure and outputting in a sorted manner. In a non-limiting example, the sorted clustered may be outputted in ascendance manner from high to low.

According to some embodiments, the ranking is performed by at least one of the following approaches: (i) inter-cluster statistics; (ii) probability of representing a fraudster; customers or any combination thereof.

According to some embodiments, the inter-cluster statistics represent the level of "confidence" that the cluster includes call interactions that share the same voice.

According to some embodiments, the probability of representing a fraudster may be performed using one or more of the following factors: (i) same voice on same claimed customer also known as "targeted attack"; (ii) same voice on different claimed customer, also known as "spread out attack"; (iii) fraudulent behavioral characteristics of the call interaction, manifested in the voice such as deception acoustic features: stutter, jitter, shimmer and the like, and (iv) metadata representing details of a predefined line of business that is more prone to fraud attacks than others.

According to some embodiments, each factor may be attributed with a predefined weight value and the ranking algorithm 600 may be further based on a weighted average of the factors. The weights may be predefined in collaboration with the employees in the call center.

In some embodiments, ranking algorithm 600 may be illustrated by the following pseudo code, given N clusters:
Init an empty array A
For i from 1 to N:
  TmpSum=Sum(all pairwise compares in cluster i)
  clusterMean=TmpSum/numberOfCompares
  clusterVariance=variance(all pairwise compares in cluster i)
  clusterScore=clusterMean/(clusterVariance+1)
  A.append(clusterScore,i)
A=A.sort #based on clusterScore
Display to the user 'y' highest scored clusters.

Figure 7:
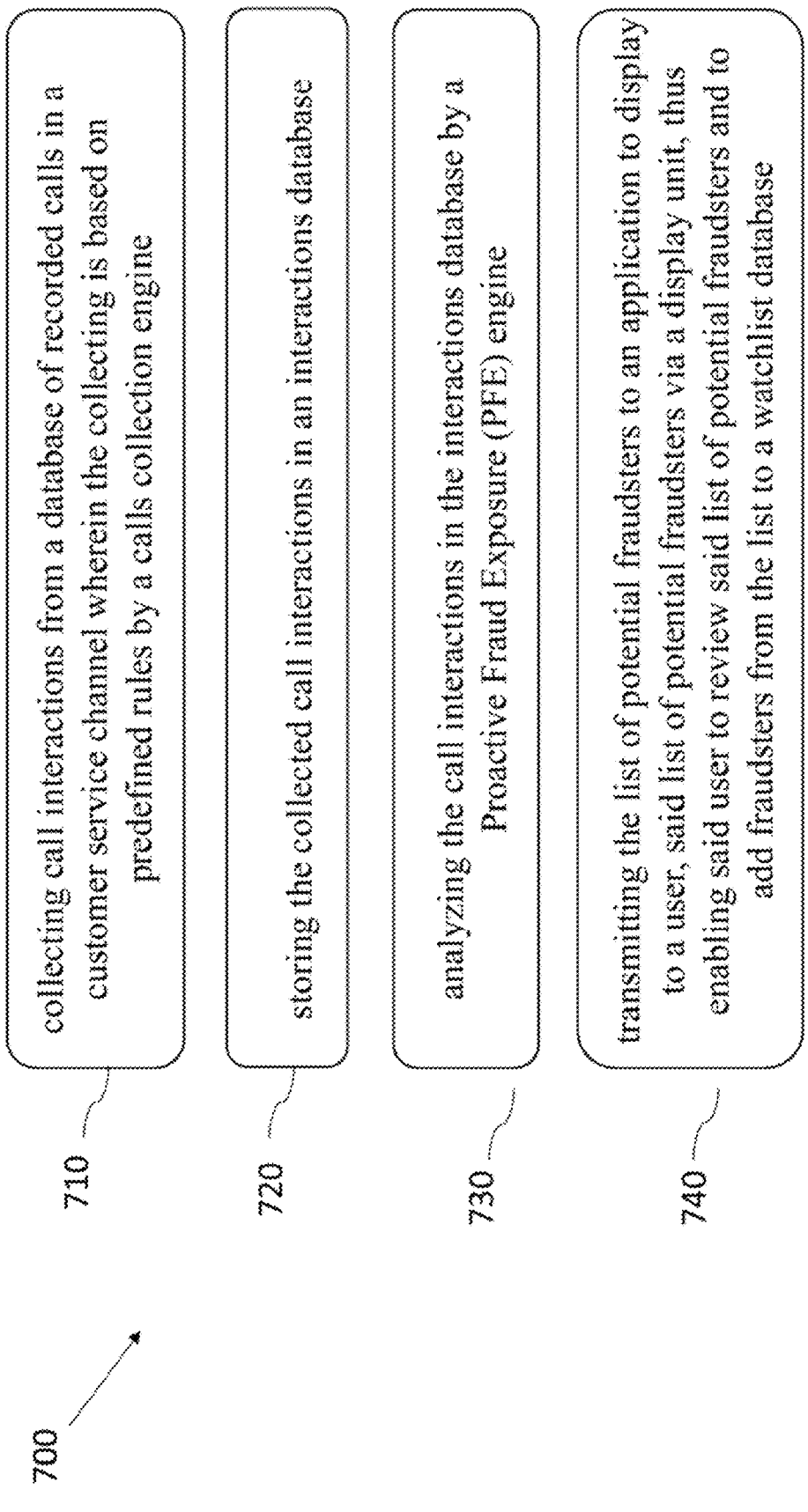
FIG. 7 is a high-level flow diagram depicting a method for proactive fraudster exposure, in accordance with some embodiments of the present disclosure.

FIG. 7 is a high-level flow diagram depicting a method for proactive fraudster exposure 700, in accordance with some embodiments of the present disclosure.

In some embodiments, proactive fraudster exposure 700 may comprise operation 710 for collecting call interactions from a database of recorded calls (not shown) in a customer service center having multiple service channels, whereby the collecting is based on predefined rules by a calls collection engine, e.g., calls collection engine 100 in FIG. 1.

In some embodiments, operation 720 may comprise storing the collected call interactions in an interactions database, e.g., interactions database 110 in FIG. 1.

In some embodiments, operation 730 may comprise analyzing the call interactions in the interactions database 110 in FIG. 1 by a Proactive Fraud Exposure (PFE) engine, e.g., PFE engine 200 in FIG. 2.

In some embodiments, operation 740 may comprise transmitting the list of potential fraudsters to an application, e.g., application 260 in FIG. 2 to display to a user, the list of potential fraudsters via a display unit, e.g., display unit 250 in FIG. 2, thus enabling the user, e.g., a security officer to review the list of potential fraudsters and to add fraudsters from the list to a watchlist database, e.g., watchlist database 240 in FIG. 2.

Figure 8:
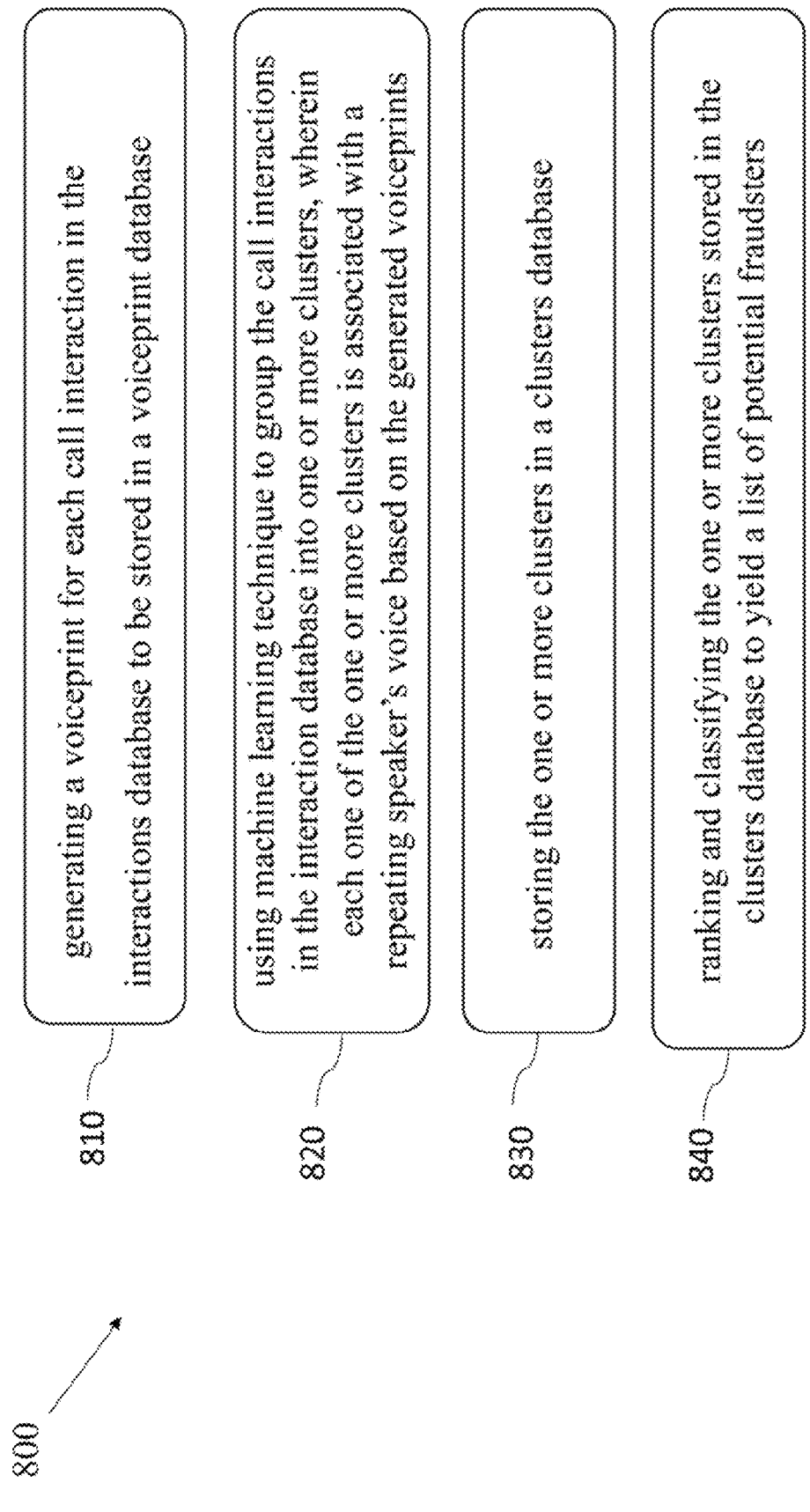
FIG. 8 is a high-level flow diagram depicting a method for analyzing the call interactions by a Proactive Fraud Exposure (PFE) engine, in accordance with some embodiments of the present disclosure.

FIG. 8 is a high-level flow diagram depicting a method for analyzing the call interactions by a Proactive Fraud Exposure (PFE) engine, in accordance with some embodiments of the present disclosure.

According to some embodiments, operation 730 in FIG. 7 may comprise analyzing the call interactions by a Proactive Fraud Exposure (PFE) engine. Such operation 730 may comprise operations 800 depicting a method for analyzing the call interactions by a Proactive Fraud Exposure (PFE) engine. According to some embodiments, operation 810 may comprise generating a voiceprint for each call interaction in the interactions database 210 in FIG. 2 to be stored in a voiceprints database 220 in FIG. 2.

According to some embodiments, operation 820 may comprise using machine learning technique to group the call interactions in the interaction database, e.g., interaction database 210 in FIG. 2 into one or more clusters, whereby each one of the one or more clusters is associated with a repeating speaker's voice based on the generated voiceprints.

According to some embodiments, operation 830 may comprise storing the one or more clusters in a clusters database, e.g., clusters database 230 in FIG. 2. In some embodiments, operation 840 may comprise ranking and classifying the one or more clusters stored in a clusters database, e.g., clusters database 230 in FIG. 2 to yield a list of potential fraudsters.

According to some embodiments of the present disclosure, the similarity algorithm may use a log likelihood ratio, where this ratio is calculated as follows: given two i-vectors, V1 and V2, assuming V1 and V2 are normally distributed with mean 0 and variance 1, the ratio may be calculated according to the following calculation:

$$\mathrm{ratio}(V1, V2) = \sum_{i=1}^{i=n} V1[i]^2 - \sum_{i=1}^{i=n} V2[i]^2$$

n may be the length of the i-vector, in a non-limiting example n may be equal to 400.

In some embodiments of the present disclosure, the method may include calculating the predefined threshold from a decision boundary of a distribution of the similarity scores for voiceprints generated from speech data chunks.

It should be understood with respect to any flowchart referenced herein that the division of the illustrated method into discrete operations represented by blocks of the flowchart has been selected for convenience and clarity only. Alternative division of the illustrated method into discrete operations is possible with equivalent results. Such alternative division of the illustrated method into discrete operations should be understood as representing other embodiments of the illustrated method.

Similarly, it should be understood that, unless indicated otherwise, the illustrated order of execution of the operations represented by blocks of any flowchart referenced herein has been selected for convenience and clarity only. Operations of the illustrated method may be executed in an alternative order, or concurrently, with equivalent results. Such reordering of operations of the illustrated method should be understood as representing other embodiments of the illustrated method.

Different embodiments are disclosed herein. Features of certain embodiments may be combined with features of other embodiments; thus certain embodiments may be combinations of features of multiple embodiments. The foregoing description of the embodiments of the disclosure has been presented for the purposes of illustration and description. It is not intended to be exhaustive or to limit the disclosure to the precise form disclosed. It should be appreciated by persons skilled in the art that many modifications, variations, substitutions, changes, and equivalents are possible in light of the above teaching. It is, therefore, to be understood that the appended claims are intended to cover all such modifications and changes as fall within the true spirit of the disclosure.

While certain features of the disclosure have been illustrated and described herein, many modifications, substitutions, changes, and equivalents will now occur to those of ordinary skill in the art. It is, therefore, to be understood that the appended claims are intended to cover all such modifications and changes as fall within the true spirit of the disclosure.

What is claimed:

1. A computer-implemented method for analyzing call interactions in an interactions database by a Proactive Fraud Exposure (PFE) engine, the computer-implemented method comprising:
    (i) generating a voiceprint for each call interaction in an interactions database by extracting i-vectors which represent a speaker effect and a channel effect to be stored in a voiceprints database;
    (ii) using a machine learning technique to group call interactions in the interaction database into one or more clusters based on respective voiceprints in the voiceprints database,
        wherein each one of the one or more clusters is associated with a repeating speaker's voice based on the generated voiceprints;
    (iii) storing the one or more clusters in a clusters database;
    (iv) ranking and classifying the one or more clusters stored in the clusters database to yield a list of potential fraudsters, and
        transmitting the list of potential fraudsters to an application to display to a user
        said list of potential fraudsters via a display unit, thus enabling said user to review said list of potential fraudsters and to add fraudsters from the list to a watchlist database.

2. The computer-implemented method of claim 1, the method further comprising detecting fraudsters which are stored on the watchlist database in new call interactions to a customer service center via one of multiple service channels, in real-time.

3. The computer-implemented method of claim 1, wherein the ranking is performed by at least one of: (i) inter-cluster statistics; and (ii) probability of representing a fraudster or any combination thereof.

4. The computer-implemented method of claim 3, wherein the probability of representing a fraudster is calculated based on at least one of the following factors: (i) same voice on same claimed customer; (ii) same voice on different claimed customers; (iii) fraudulent behavioral characteristics of the call interaction, manifested in the voice; and (iv) metadata representing details of a predefined line of business.

5. The computer-implemented method of claim 4, wherein the method further comprising attributing a predefined weight value to the factors and wherein the ranking is further based on a weighted average of the factors.

6. The computer-implemented method of claim 1, wherein before the generating of the voiceprint for each call interaction in the interactions database, the computer-implemented method further comprising:
    collecting call interactions from a database of recorded calls in a customer service channel,
    wherein the collecting is based on predefined rules by a calls collection engine, and
    storing the collected call interactions in an interactions database.

7. The computer-implemented method of claim 1, wherein the computerized-implemented method is performed on audio or textual content.

8. The computer-implemented method of claim 6, wherein the collecting is further based on automated machine-learning algorithms.

9. The computer-implemented method of claim 1, wherein the ranking further includes: (i) comparing each call interaction in the interaction database to all other call interactions in the call interaction database to yield a matrix of comparisons; (ii) scoring each pair of call interactions based on the extracted i-vectors; (iii) retrieving from each row in the matrix of comparisons a pair of call interactions (i, j) with a higher score; and (iv) for each retrieved pair of call interactions (i, j) perform clustering.

10. The computer-implemented method of claim 9, wherein the clustering is performed according to the following conditions:
    when the score of a pair of call interactions (i, j) is higher than a predefined threshold:
        a. when both call interactions (i, j) were not assigned to a cluster, assign both interactions to a new cluster;
        b. when only one of the call interactions (i, j) is assigned to a cluster add the call interaction that is not assigned to the cluster;
        c. when both call interactions are assigned merge them to one cluster; and
    when the score of the pair of call interactions (i, j) is not higher than a predefined threshold:
        call interaction (i) is assigned to a new cluster.

11. The computer-implemented method of claim 1, wherein the classifying comprises calculating a confidence value for each cluster based on inner ties between the call interactions in the cluster.

12. The computer-implemented method of claim 6, wherein the predefined rules are at least one of: (i) mismatch during customer authentication; (ii) business data; (iii) agents that are associated with a risk group or line of business; (iv) behavioral flows of the speaker; (v) call content analysis; and (vi) frequency of the call interactions or any combination thereof.

13. A computerized-system for analyzing call interactions in an interactions database by a Proactive Fraud Exposure (PFE) engine, the computerized-system comprising:
    a database of recorded calls;
    an interactions database;
    a voiceprints database;
    a clusters database;
    a memory to store the database of recorded calls, the interactions database, the voiceprints database and the clusters database;
    a display unit; and
    a processor, said processor is configured to:
        a. generate a voiceprint for each interaction in the interaction database by extracting i-vectors which represent a speaker effect and a channel effect to be stored in the voiceprints database;
b. use a machine learning technique to group the call interactions in the interaction database into one or more clusters,
   wherein each one of the one or more clusters is associated with a repeating speaker's voice based on the generated voiceprints,
c. store the one or more clusters in a clusters database; and
d. rank and classify the one or more clusters stored in the clusters database to yield a list of potential fraudsters; and transmit the list of potential fraudsters to an application to display to a user said list of potential fraudsters via a display unit thus, enabling said user upon review of said list of potential fraudsters to add fraudsters from said list of potential to a watchlist database.

\* \* \* \* \*